US010311721B1

(12) United States Patent
Shibata

(10) Patent No.: US 10,311,721 B1
(45) Date of Patent: Jun. 4, 2019

(54) TRAFFIC CONTROL SYSTEM

(71) Applicant: YAMAHA HATSUDOKI KABUSHIKI KAISHA, Iwata, Shizuoka (JP)

(72) Inventor: Hideki Shibata, Irvine, CA (US)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/916,821

(22) Filed: Mar. 9, 2018

(51) Int. Cl.
  *G08G 1/01* (2006.01)
  *B64C 39/02* (2006.01)
  *B64D 43/02* (2006.01)
  *G08G 1/0955* (2006.01)

(52) U.S. Cl.
  CPC ......... *G08G 1/0137* (2013.01); *B64C 39/024* (2013.01); *B64D 43/02* (2013.01); *G08G 1/0116* (2013.01); *G08G 1/0955* (2013.01)

(58) Field of Classification Search
  CPC ............ G08G 1/07; G08G 1/08; G08G 1/095; G08G 1/0137; G08G 1/0116; G08G 1/0955; B64C 39/024; B64D 43/02
  USPC .......................... 340/907, 908, 909, 916, 917
  See application file for complete search history.

(56) References Cited

U.S. PATENT DOCUMENTS

| | | | |
|---|---|---|---|
| 7,633,408 B2 * | 12/2009 | Yingst | G08G 1/0955 340/907 |
| 8,362,923 B2 * | 1/2013 | Witte | G08G 1/07 340/908 |
| 9,111,445 B1 * | 8/2015 | Pashel | G08G 1/081 |
| 2004/0246144 A1 * | 12/2004 | Siegel | G08G 1/087 340/902 |
| 2012/0188099 A1 * | 7/2012 | Lee | G08G 1/087 340/906 |
| 2015/0243165 A1 * | 8/2015 | Elsheemy | B60R 25/00 340/906 |
| 2016/0090194 A1 * | 3/2016 | O'Dell | B64C 13/04 701/3 |
| 2017/0235303 A1 * | 8/2017 | Haruta | B64C 13/20 701/2 |
| 2018/0018883 A1 * | 1/2018 | Kotecha | G08G 5/0034 |
| 2018/0257775 A1 * | 9/2018 | Baek | B64C 27/20 |

FOREIGN PATENT DOCUMENTS

| | | | | |
|---|---|---|---|---|
| JP | 2004-030082 A | | 1/2004 | |
| JP | 2004-252854 A | | 9/2004 | |
| JP | 2008-068711 A | | 3/2008 | |
| JP | 2008068711 A | * | 3/2008 | ........... G05D 1/0044 |

* cited by examiner

*Primary Examiner* — Hung T Nguyen
(74) *Attorney, Agent, or Firm* — Global IP Counselors, LLP

(57) ABSTRACT

A traffic control system includes at least one traffic signal, an aircraft and a ground control station. The aircraft includes a position sensor and a wireless communication device. The ground control station includes an electronic controller and a wireless communication device. The electronic controller is configured to control the at least one traffic signal based on at least one of position data of the aircraft and direction data of the aircraft.

20 Claims, 9 Drawing Sheets

TRAFFIC CONTROL SYSTEM

BACKGROUND

Field of the Invention

The present invention generally relates to a traffic control system. More specifically, the present invention relates to a traffic control system for controlling a traffic signal.

Background Information

Recently, with the rapid development of unmanned aerial vehicle technology, unmanned aerial vehicles have been used for a wide range of industrial application, such as agricultural uses including spraying, seeding and the like.

For the agricultural uses, an unmanned aerial vehicle flies in a predetermined work zone over the ground. Specifically, for the agricultural uses, an unmanned aerial vehicle is manually or autonomously controlled to follow a predetermined target path within the predetermined work zone.

SUMMARY

On the other hand, while an unmanned aerial vehicle flies in the predetermined work zone, perimeter roads of the predetermined work zone need to be closed for preventing traffics, such as vehicles, pedestrians and the like, from approaching the predetermined work zone. For example, during spraying the predetermined work zone, human observers are deployed at the perimeter roads for watching traffic approaching the predetermined work zone and for stopping the traffic. However, more observers are needed for a larger work zone.

Generally, the present disclosure is directed to various features of a traffic control system for controlling a traffic signal.

In accordance with one aspect of the present disclosure, a traffic control system includes at least one traffic signal, an aircraft and a ground control station. The aircraft includes a position sensor and a wireless communication device. The ground control station includes an electronic controller and a wireless communication device. The electronic controller is configured to control the at least one traffic signal based on at least one of position data of the aircraft and direction data of the aircraft.

Also, other features, aspects and advantages of the disclosed traffic control system will become apparent to those skilled in the field of manufacturing traffic control systems from the following detailed description, which, taken in conjunction with the annexed drawings, discloses several illustrative embodiments of a traffic control system with various features.

BRIEF DESCRIPTION OF THE DRAWINGS

Referring now to the attached drawings which form a part of this original disclosure.

Figure 1:
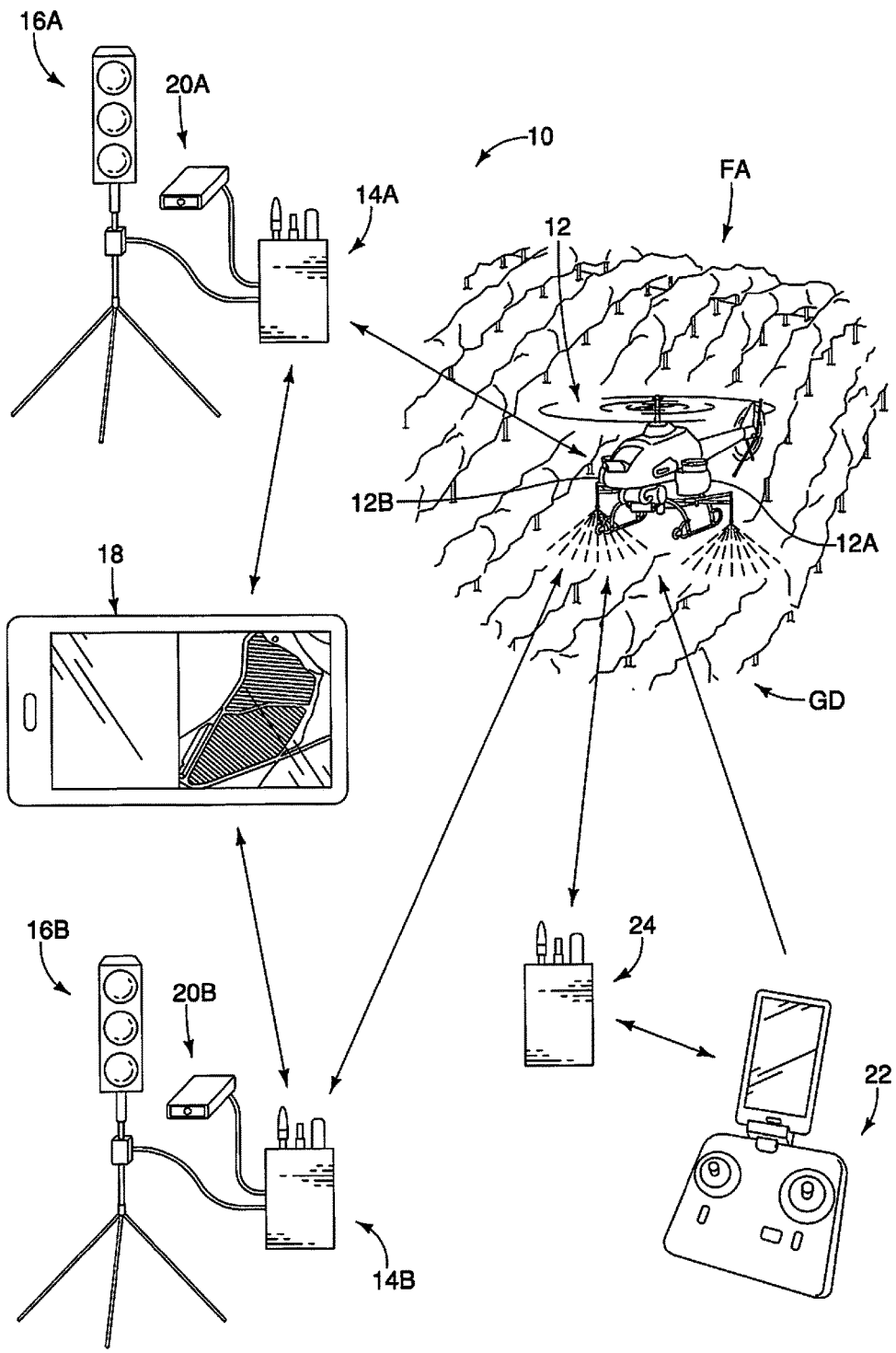
FIG. 1 is a schematic diagram illustrating an overall configuration of a traffic control system in accordance with one embodiment, illustrating an aircraft communicating with a plurality of traffic signal control stations and an aircraft control station, a control module communicating with the traffic signal control stations and a remote controller for manually controlling the aircraft with radio signals communicating with the aircraft control station.

It should be noted that these figures are intended to illustrate the general characteristics of methods, structure and/or materials utilized in certain illustrative embodiments and to supplement the written description provided below. These drawings are not, however, to scale and may not precisely reflect the precise structural or performance characteristics of any given embodiment, and should not be interpreted as defining or limiting the range of values or properties encompassed by illustrative embodiments. The use of similar or identical reference numbers in the various drawings is intended to indicate the presence of a similar or identical element or feature.

DETAILED DESCRIPTION OF EMBODIMENTS

Selected embodiments will now be explained with reference to the drawings. It will be apparent to those skilled in the field of traffic control systems from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments.

Referring initially to FIG. 1, a traffic control system 10 is illustrated in accordance with one embodiment. As illustrated in FIG. 1, the traffic control system 10 includes an aircraft 12, a plurality of traffic signal control stations 14A and 14B (e.g., a ground control station and an additional ground control station) and a plurality of traffic signals 16A and 16B (e.g., at least one traffic signal). Here, in the illustrated embodiment, the traffic control system 10 includes only two of the traffic signal control stations 14A and 14B corresponding to two of the traffic signals 16A and 16B, respectively. However, it will be apparent to those skilled in the field of traffic control systems from this disclosure that the traffic control system 10 can be configured with only a single one of the traffic signal control stations 14A and 14B corresponding to a single one of the traffic signals 16A and 16B, or more than two of the traffic signal control stations 14A and 14B corresponding to more than two of the traffic signals 16A and 16B, as needed and/or desired for the particular system. Furthermore, it will be apparent to those skilled in the field of traffic control systems from this disclosure that the traffic control system 10 can be configured with a single one of the traffic signal control stations 14A and 14B corresponding to more than one of the traffic signals 16A and 16B, as needed and/or desired for the particular system.

As illustrated in FIG. 1, the aircraft 12 is illustrated as a helicopter. Specifically, in the illustrated embodiment, the aircraft 12 is an unmanned helicopter. Specifically, the aircraft 12 has a main rotor rotatably provided at an upper part of a main body and a tail rotor rotatably provided at a rear part of a tail body. Furthermore, in the illustrated embodiment, the aircraft 12 has a pair of crop dusting tanks 12A and 12B (e.g., at least one crop dusting tank). The crop dusting tanks 12A and 12B holds the agricultural material, such as chemicals, fertilizers and the like, for crops. In the illustrated embodiment, the aircraft 12 further has conventional physical configurations, such as an internal combustion engine 60 (FIG. 3), an intake system, an exhaust system and a fuel tank within the man body. Of course, instead of the engine 60, the aircraft 12 can have other types of prime movers, such as an electric motor. Also, the aircraft 12 has a plurality of (five, for example) servos 62 (FIG. 3), with three of them connected to a swashplate via linkages to change the pitch (angle) of main blades of the main rotor (i.e., an aileron servo, an elevator servo and a pitch servo), one of them connected to tail blades of the tail rotor via a linkage to change the pitch (angle) of the tail blades of the tail rotor (i.e., a rudder servo) and one of them connected to the engine 60 via a linkage to control the throttle of the engine 60 (i.e., a throttle servo). These physical configurations of the aircraft are relatively conventional, and thus will not be described in detail for the sake of brevity. In the illustrated embodiment, the aircraft 12 is illustrated as a helicopter. However, it will be apparent to those skilled in the field of traffic control systems from this disclosure that the aircraft 12 can be other types of manned or unmanned aerial vehicles, such as airplanes, and thus are not limited to any particular aircrafts.

In the illustrated embodiment, the aircraft 12 flies in a predetermined flight area or work zone FA over a ground GD to spay agricultural materials, such as chemicals, fertilizers and seeds, for crops. Specifically, the aircraft 12 is manually or autonomously controlled to follow a target flight path within the predetermined flight area FA. In the illustrated embodiment, the aircraft 12 is used for agricultural uses. However, the aircraft 12 can also be used for a wide range of industrial application other than the agricultural uses.

In the illustrated embodiment, the aircraft 12 is configured to carry out wireless communications with the traffic signal control stations 14A and 14B. In the illustrated embodiment, the aircraft 12 and the traffic signal control stations 14A and 14B establish communication datalinks therebetween using 900 MHz radio signals. However, it will be apparent to those skilled in the field of traffic control systems from this disclosure that the wireless communications can be carried out using other wireless technology as needed and/or desired.

Referring to FIG. 1, the traffic signal control stations 14A and 14B are each examples of a mobile or portable GCS (ground control station). The traffic signal control stations 14A and 14B are configured to control the traffic signals 16A and 16B, respectively, based on operational status of the aircraft 12, such as a position (e.g., position data) of the aircraft 12, a heading of the aircraft 12, a velocity of the aircraft 12 (e.g., velocity data), an attitude of the aircraft 12, an engine rotational speed (or engine RPM) of the engine 60 and the like, obtained through the communication datalinks between the aircraft 12 and the traffic signal control stations 14A and 14B. Specifically, the traffic signal control stations 14A and 14B are interconnected to the traffic signals 16A and 16B, respectively, by electrical wires for carrying out communications therebetween. However, it will be apparent to those skilled in the field of traffic control systems from this disclosure that the traffic signal control stations 14A and 14B can be wirelessly interconnected to the traffic signals 16A and 16B, respectively, as needed and/or desired. Also, in the illustrated embodiment, the traffic signal control stations 14A and 14B are independently provided as separate devices from the traffic signals 16A and 16B, respectively. However, it will be apparent to those skilled in the field of traffic control systems from this disclosure that the traffic signal control stations 14A and 14B can be integrated with the traffic signals 16A and 16B, respectively. In the illustrated embodiment, the traffic signal control stations 14A and 14B are basically identical. However, of course, the traffic signal control stations 14A and 14B can be different, as needed and/or desired.

As illustrated in FIG. 1, the traffic signals 16A and 16B each include a traffic light or lamp with red, yellow and green signal lights, and a stand to support the traffic light. In the illustrated embodiment, the traffic signals 16A and 16B are each examples of a portable traffic signal, and can be placed at any locations as needed and/or desired. Specifically, in the illustrated embodiment, the traffic signals 16A and 16B are placed at separate locations on a perimeter road or area of the predetermined flight area FA to signal a closure or an open of the perimeter road or area. Specifically, the traffic signals 16A and 16B receive control signals from the traffic signal control stations 14A and 14B through the electrical wires, respectively, and turn on/off the red, yellow and green signal lights based on the control signals.

In particular, although not illustrated in FIG. 1, the traffic signals 16A and 16B can each include an onboard control module with a communication unit for receiving the control signals and for controlling the traffic light based on the control signals. The onboard control modules of the traffic signals 16A and 16B turn on the red signal lights to signal the closure of the perimeter road or area, and turn on the green signal lights to signal the open of the perimeter road or area. Furthermore, the onboard control modules of the traffic signals 16A and 16B turn on the yellow signal lights to signal that the red signal lights are about to appear. In the illustrated embodiment, the traffic signals 16A and 16B each include the red, yellow and green signal lights. However, it will be apparent to those skilled in the field of traffic control systems from this disclosure that the traffic signals 16A and 16B can only include the red and green signal lights as needed and/or desired.

Furthermore, the traffic signals 16A and 16B can each include a power source, such as a battery, a solar panel and the like, that supplies electrical energy to the components of the traffic signals 16A and 16B. Of course, the traffic signals 16A and 16B can receive electric energy from an external power source. In the illustrated embodiment, the traffic signals 16A and 16B are basically identical. However, of course, the traffic signals 16A and 16B can be different, as needed and/or desired.

As also illustrated in FIG. 1, the traffic control system 10 further includes a control module 18 and a plurality of traffic detectors 20A and 20B. Referring to FIG. 1, the control module 18 is illustrated as a tablet computer or tablet. The control module 18 is configured to set a restricted area relative to the perimeter road or area of the predetermined flight area FA through a graphical user interface (GUI) of the control module 18, and send restricted area information indicative of the restricted area to the traffic signal control stations 14A and 14B. The control module 18 is also configured to receive current traffic light state of the traffic signals 16A and 16B via the traffic signal control stations 14A and 14B, respectively, and display the current traffic light state of the traffic signals 16A and 16B on a screen of the control module 18. In the illustrated embodiment, the control module 18 is wirelessly interconnected to the traffic signal control stations 14A and 14B. For example, the traffic signal control stations 14A and 14B and the control module 18 establish WiFi connections therebetween using 2.4 GHz band. However, it will be apparent to those skilled in the field of traffic control systems from this disclosure that the control module 18 can be interconnected to the traffic signal control stations 14A and 14B using other wireless or wired technology as needed and/or desired. In the illustrated embodiment, the control module 18 is illustrated as a tablet computer. However, it will be apparent to those skilled in the field of traffic control systems from this disclosure that the control module 18 can be configured with other electronic devices, such as a portable PC, a mobile phone and the like. In the illustrated embodiment, the traffic control system 10 includes only a single control module 18 for two of the traffic signal control stations 14A and 14B. However, it will be apparent to those skilled in the field of traffic control systems from this disclosure that the traffic control system 10 can be configured with two control modules 18 corresponding to the traffic signal control stations 14A and 14B, respectively, as needed and/or desired for the particular system.

Referring to FIG. 1, the traffic detectors 20A and 20B are each examples of a remote sensing device for detecting traffics, such as vehicles (e.g., motor vehicles, motorcycles, bicycles), pedestrians and the like, that approach or intrude the perimeter road or area of the predetermined flight area FA where the traffic signals 16A and 16B are placed. In the illustrated embodiment, the traffic detectors 20A and 20B are illustrated as a video camera with an image sensor. The traffic detectors 20A and 20B are installed near the traffic signals 16A and 16B, respectively, and are configured to capture videos of the traffics that approach or intrude the perimeter road or area. The traffic detectors 20A and 20B are interconnected to the traffic signal control stations 14A and 14B by electric wires, respectively, for sending the captured videos and/or the detection results to the traffic signal control stations 14A and 14B, respectively. In the illustrated embodiment, the traffic detectors 20A and 20B are illustrated as a video camera. However, it will be apparent to those skilled in the field of traffic control systems from this disclosure that the traffic detectors 20A and 20B can be any other remote sensing devices, such as devices using radar, lidar and the like. Also, in the illustrated embodiment, the traffic detectors 20A and 20B are illustrated as separate devices from the traffic signals 16A and 16B, respectively. However, it will be apparent to those skilled in the field of traffic control systems from this disclosure that the traffic detectors 20A and 20B can be integrated with the traffic signals 16A and 16B, respectively.

As also illustrated in FIG. 1, the traffic control system 10 further includes a remote controller 22 and an aircraft control station 24. The remote controller 22 is illustrated as a transmitter that transmits control signals to remotely and manually control the aircraft 12. In the illustrated embodiment, for example, the remote controller 22 transmits the control signals as radio signals of 72 MHz band. However, it will be apparent to those skilled in the field of traffic control systems from this disclosure that the remote controller 22 can use different frequency bands as needed and/or desired. The remote controller 22 also has a display module that displays the operational status of the aircraft 12 obtained from the aircraft 12 via the aircraft control station 24.

The aircraft control station 24 is also an example of a mobile or portable GCS (ground control station). The aircraft control station 24 is configured to obtain the operational status of the aircraft 12 from the aircraft 12, and to transmit the operational status of the aircraft to the remote controller 22. Specifically, the aircraft 12 is configured to carry out wireless communications with the aircraft control station 24. In the illustrated embodiment, for example, the aircraft 12 and the aircraft control station 24 establish a communication datalink therebetween using 900 MHz radio signals. However, it will be apparent to those skilled in the field of traffic control systems from this disclosure that the wireless communications can be carried out using other wireless technology as needed and/or desired. Also, the aircraft control station 24 is wirelessly interconnected to the remote controller 22 (e.g., the display module of the remote controller 22). For example, the remote controller 22 and the aircraft control station 24 establish a WiFi connection therebetween using 2.4 GHz band. However, it will be apparent to those skilled in the field of traffic control systems from this disclosure that the aircraft control station 24 can be interconnected to the remote controller 22 using other wireless technology as needed and/or desired.

Figure 2:
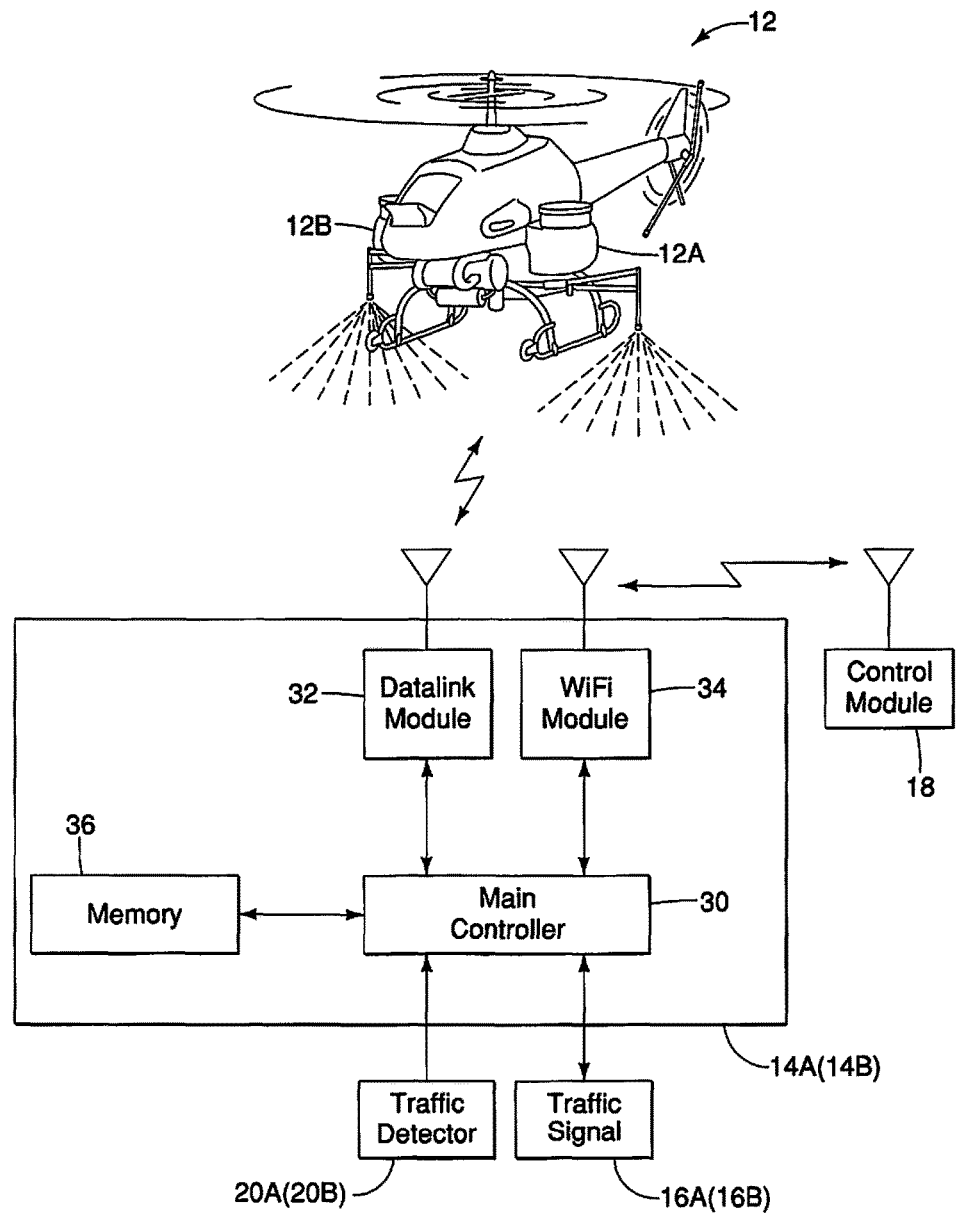
FIG. 2 is a block diagram of the traffic signal control stations illustrated in FIG. 1, illustrating wired connections between the traffic signal control stations and traffic signals, wired connections between the traffic signal control stations and traffic detectors, wireless connections between the traffic signal control stations and the control module and wireless connections between the traffic signal control stations and the aircraft.

Referring now to FIG. 2, the traffic signal control stations 14A and 14B will now be discussed in more detail. The traffic signal control stations 14A and 14B are basically identical. Thus, the parts of the traffic signal control stations 14A and 14B will be given the same reference symbols for the sake of brevity.

As illustrated in FIG. 2, the traffic signal control stations 14A and 14B each includes a main controller 30 (e.g., an electronic controller), a datalink module 32 (e.g., a wireless communication device), a WiFi module 34 and a computer memory 34.

Basically, the main controllers 30 of the traffic signal control stations 14A and 14B receive the operational status of the aircraft 12 from the aircraft 12 via the datalink modules 32 of the traffic signal control stations 14A and 14B, respectively, and output command signals to the datalink modules 32 of the traffic signal control stations 14A and 14B, respectively, that in turn transmit the command signals to the aircraft 12. Furthermore, the main controllers 30 of the traffic signal control stations 14A and 14B receive the restricted area information from the control module 18 via the WiFi modules 34 of the traffic signal control stations 14A and 14B, respectively, and output the current traffic light state of the traffic signals 16A and 16B to the WiFi modules 34 of the traffic signal control stations 14A and 14B, respectively, that in turn transmit the current traffic light state of the traffic signals 16A and 16B to the control module 18, respectively. The main controllers 30 of the traffic signal control stations 14A and 14B also receive the current traffic light state of the traffic signals 16A and 16B from the traffic signals 16A and 16B, respectively, and the captured videos and/or the detection results from the traffic detectors 20A and 20B, respectively, and output the control signals to the traffic signals 16A and 16B, respectively.

The main controllers 30 of the traffic signal control stations 14A and 14B each basically have at least one processor with at least one control program that controls the operations of the traffic signals 16A and 16B, respectively. More preferably, the main controllers 30 are each a microcomputer that in addition to the at least one processor further includes other conventional components such as an input interface circuit, an output interface circuit, and storage devices, such as a ROM (Read Only Memory) device and a RAM (Random Access Memory) device, flash memory, etc. For example, the internal RAM of each of the main controllers 30 stores processing results of the main controllers 30. The internal ROM of each of the main controllers 30 stores the information and programs for various operations. It will be apparent to those skilled in the field of traffic control systems from this disclosure that the precise structure and algorithms for the main controllers 30 can be any combination of hardware and software that will carry out the functions of the traffic control system 10 as described herein.

The datalink modules 32 of the traffic signal control stations 14A and 14B are a radio transceiver that includes both transmitter and receiver functions and has an integrated antenna. Specifically, in the illustrated embodiment, the datalink modules 32 are each a 900 MHz radio modem for wireless communications using 900 MHz radio signals. However, it will be apparent to those skilled in the field of traffic control systems from this disclosure that the datalink modules 32 can be other types of radio transceivers as needed and/or desired.

The WiFi modules 34 of the traffic signal control stations 14A and 14B are a radio transceiver that includes both transmitter and receiver functions and have an integrated antenna. Specifically, in the illustrated embodiment, for example, the WiFi modules 34 are an IEEE 802.11 b/g/n module for WiFi connections using 2.4 GHz band. However, it will be apparent to those skilled in the field of traffic control systems from this disclosure that the WiFi modules 34 can be other types of radio transceivers as needed and/or desired. Of course, the WiFi module 34 can be other types of communication devices interconnected to the control module 18 through a wired connection, as needed and/or desired.

The memories 36 of the traffic signal control stations 14A and 14B are a data storage device, such as a flash memory. In particular, in the illustrated embodiment, the memories 36 are a SD, miniSD or microSD card. However, it will be apparent to those skilled in the field of traffic control systems from this disclosure that the memories 36 can be other types of data storage devices. The memories 36 store a log file of the operational status of the aircraft 12 obtained from the aircraft 12 and the current traffic light state of the traffic signals 16A and 16B obtained from the traffic signals 16A and 16B, the restricted area information obtained from the control module 18, and the detection results of the traffic detectors 20A and 20B, respectively.

Figure 3:
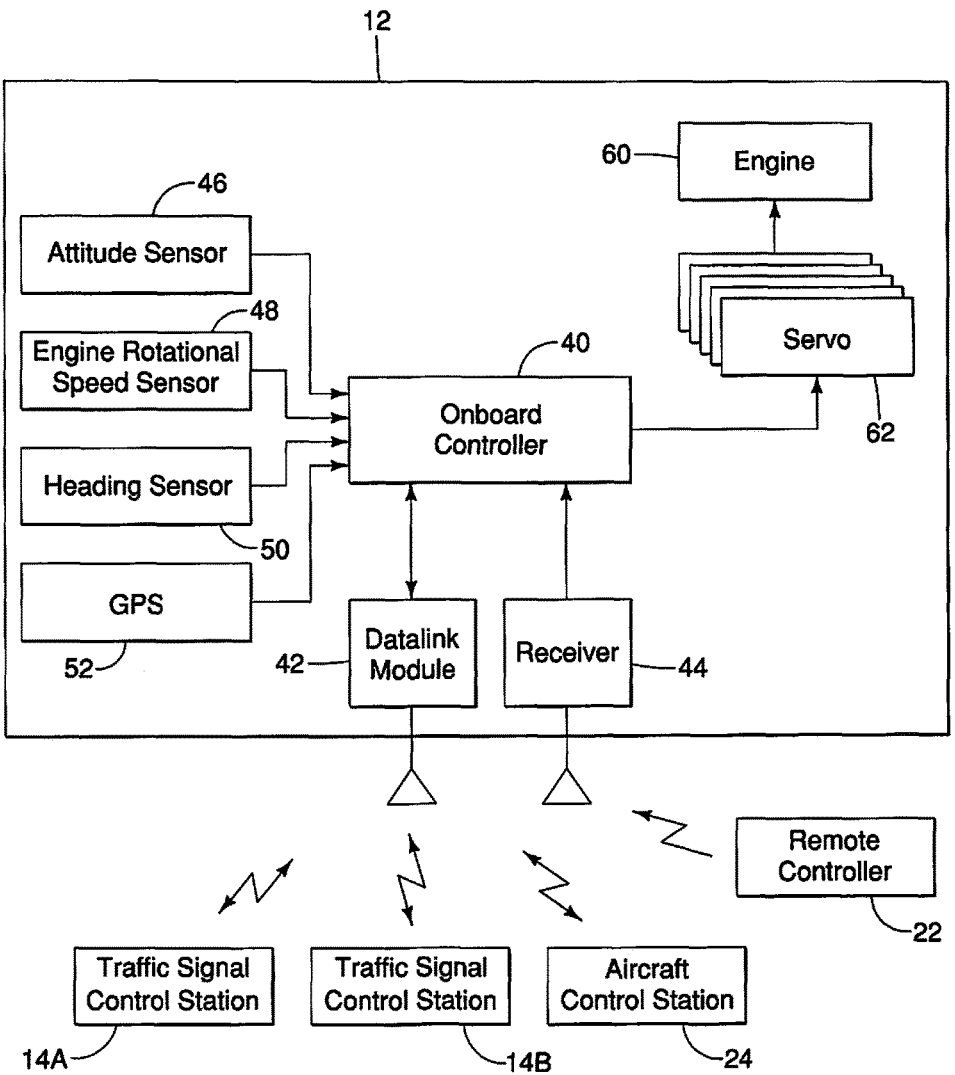
FIG. 3 is a block diagram of the aircraft illustrated in FIG. 1, illustrating wireless connections between the aircraft and the traffic signal control stations and wireless connections between the aircraft and the remote controller.

Referring now to FIG. 3, the aircraft 12 will now be discussed in more detail. The aircraft 12 includes an onboard controller 40 (e.g., an electronic onboard controller), a datalink module 42 (e.g., wireless communication device), a wireless receiver 44, an attitude sensor 46, an engine rotational speed sensor 48, a heading sensor 50 and a GPS 52 (e.g. a position sensor or a GPS sensor).

Basically, the onboard controller 40 receives the operational status of the aircraft 12 sensed by the attitude sensor 46, the engine rotational speed sensor 48, the heading sensor 50 and the GPS 52. The onboard controller 40 outputs the operational status of the aircraft 12 to the datalink module 42 that in turn transmits or broadcasts the operational status of the aircraft 12 to the traffic signal control stations 14A and 14B and the aircraft control station 24. Furthermore, the onboard controller 40 receives the command signals from the traffic signal control stations 14A and 14B via the datalink module 42, and controls the servos 62 to control the aircraft 12 according to the command signals. The onboard controller 40 also receives the control signals from the remote controller 22 via the receiver 44, and controls the servos 62 to control the aircraft 12 according to the control signals.

The onboard controller 40 basically has at least one processor with at least one control program that controls the operations of the aircraft 12, such as an auto pilot control program for autonomously controlling the aircraft 12. More preferably, the onboard controller 40 is a microcomputer that in addition to the at least one processor further includes other conventional components such as an input interface circuit, an output interface circuit, and storage devices, such as a ROM (Read Only Memory) device and a RAM (Random Access Memory) device, flash memory, etc. For example, the internal RAM of the onboard controller 40 stores processing results of the onboard controller 40. The internal ROM of the onboard controller 40 stores the information and programs for various operations. It will be apparent to those skilled in the field of traffic control systems from this disclosure that the precise structure and algorithms for the onboard controller 40 can be any combination of hardware and software that will carry out the functions of the traffic control system 10 as described herein.

The datalink module 42 is a radio transceiver that includes both transmitter and receiver functions and has an integrated antenna. Specifically, in the illustrated embodiment, for example, the datalink module 42 is a 900 MHz radio modem for wireless communications using 900 MHz radio signals. However, it will be apparent to those skilled in the field of traffic control systems from this disclosure that the datalink module 42 can be other types of radio transceivers as needed and/or desired.

The receiver 44 is a radio receiver and has an integrated antenna. Specifically, in the illustrated embodiment, for example, the receiver 44 is a radio receiver that receives the radio signals of 72 MHz band. However, it will be apparent to those skilled in the field of traffic control systems from this disclosure that the receiver 44 can be other types of radio receivers as needed and/or desired.

The attitude sensor 46 has a three-axis gyroscope and a three-axis accelerometer. The gyroscope detects rotation (angular velocity) about an X-axis, a Y-axis, and a Z-axis of the aircraft 12. The accelerometer detects acceleration along the XYZ axes. In the illustrated embodiment, the X-axis is a roll axis of the aircraft 12, the Y-axis is a pitch axis of the aircraft 12, and the Z-axis is a yaw axis of the aircraft 12. The attitude sensor 46 processes the rotation and the acceleration to output the attitude of the aircraft 12 to the onboard controller 40. Of course, the attitude sensor 46 can be other types of sensors that detect the attitude of the aircraft 12.

The engine rotational speed sensor 48 has a Hall effect sensor that detects the engine rotational speed of the engine 60, for example. The engine rotational speed sensor 48 outputs the engine rotational speed to the onboard controller 40. Of course, the engine rotational speed sensor 48 can be other types of sensors that detect the engine rotational speed of the engine 60.

The heading sensor 50 has a three-axis magnetometer. The magnetometer detects the Earth's magnetic field along the XYZ axes. The heading sensor 50 outputs the heading of the aircraft 12 to the onboard controller 40. Of course, the heading sensor 50 can be other types of sensors that detect the heading of the aircraft 12.

The GPS 52 receives satellite signals from satellites, and outputs the position and the velocity of the aircraft 12 to the onboard controller 40. Of course, it will be apparent to those skilled in the field of traffic control systems from this disclosure that the GPS 52 can be an RTK (real time kinematic) GPS that receives correction data from a ground base station to correct the position and the velocity of the aircraft 12. Furthermore, it will be apparent to those skilled in the field of traffic control systems from this disclosure that the position and the velocity of the aircraft 12 can be derived from satellite-based positioning systems (global navigation satellite systems, GNSS) other than GPS, such as, GLONASS, Galileo and BeiDou, for example. In the illustrated embodiment, the aircraft 12 includes the attitude sensor 46, the engine rotational speed sensor 48, the heading sensor 50 and the GPS 52. However, it will be apparent to those skilled in the field of traffic control systems from this disclosure that the aircraft 12 can include other types of sensors as needed and/or desired.

In the illustrated embodiment, the aircraft 12 can fly using a manual remote control or an autonomous control. Specifically, with the manual remote control, the onboard controller 40 receives the control signals from the remote controller 22 that is operated by an operator. In response, the onboard controller 40 controls the servos 62 according to the control signals from the remote controller 22. With the autonomous control, the onboard controller 40 receives the operational status of the aircraft 12 from the the attitude sensor 46, the engine rotational speed sensor 48, the heading sensor 50 and the GPS 52, and the command signals from the traffic signal control stations 14A and 14B. The onboard controller 40 controls the servos 62 based on the operational status of the aircraft 12 according to an auto pilot control program prescribed in advance. Specifically, in the illustrated embodiment, the onboard controller 40 autonomously controls the aircraft 12 to follow a predetermined target flight path defined within the predetermined flight area FA over the ground GD. In the onboard controller 40 also selects a control mode of the aircraft 12 between the manual remote control and the autonomous control according to a manual selection performed on the remote controller 22, or a radio reception status between the receiver 44 and the remote controller 22. The manual remote control and the autonomous control of the aircraft 12 are relatively conventional, and thus will not be described in detail.

Figure 4:
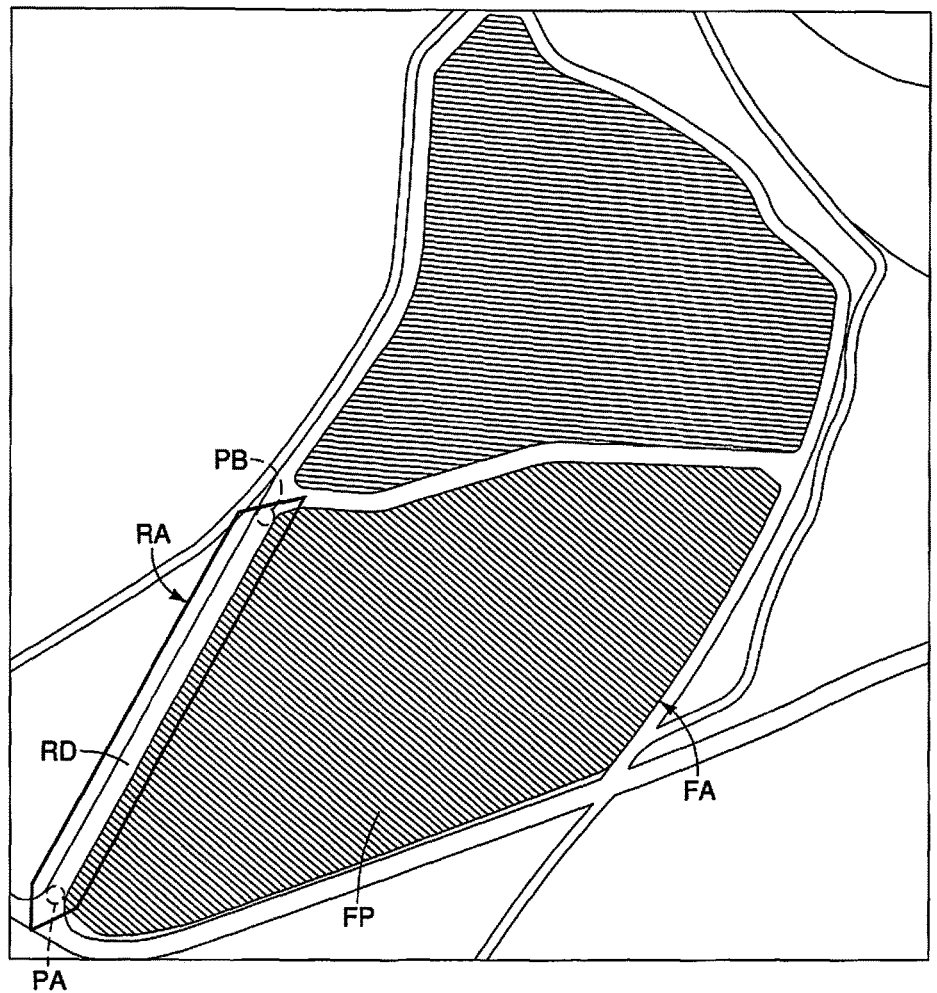
FIG. 4 is a top plan view of a flight area of the aircraft, illustrating a restricted area is set relative to a perimeter road or area of a predetermined flight area.
Figure 5:
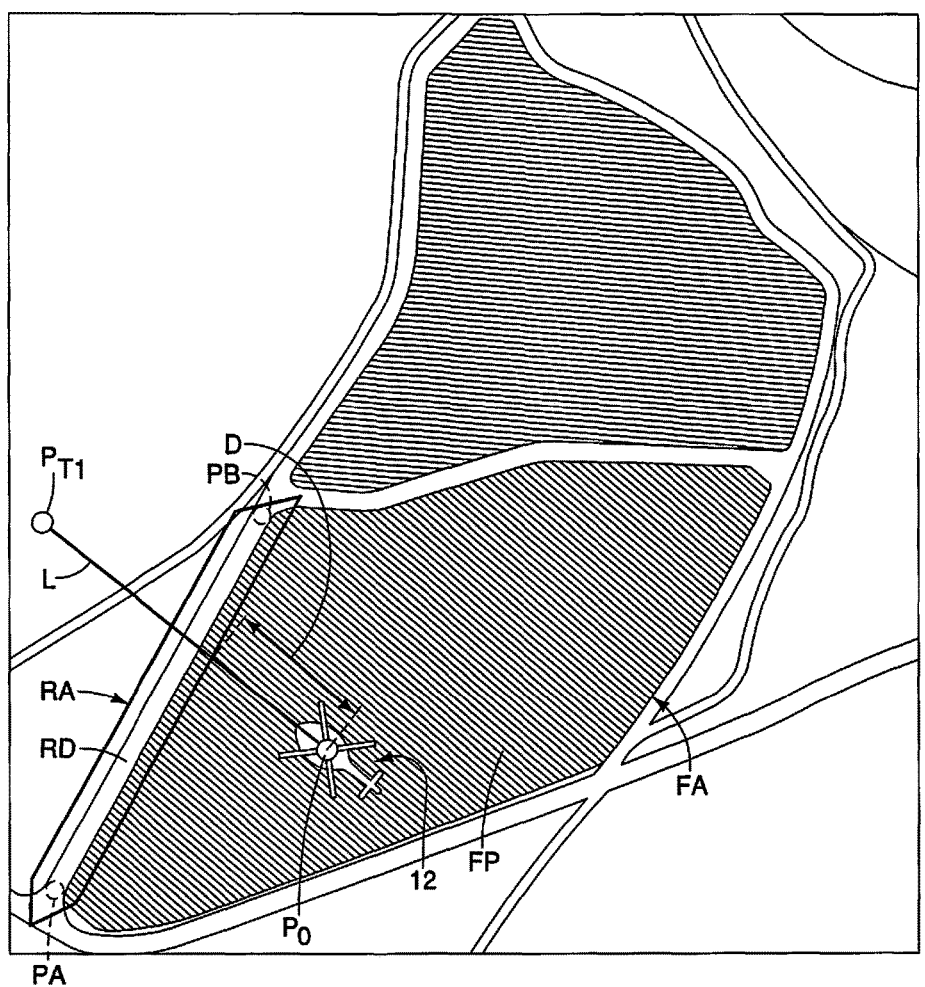
FIG. 5 is a top plan view of the flight area of the aircraft, schematically illustrating the aircraft flying within the predetermined flight area for explaining an algorithm for turning on red signal lights of the traffic signals.
Figure 6:
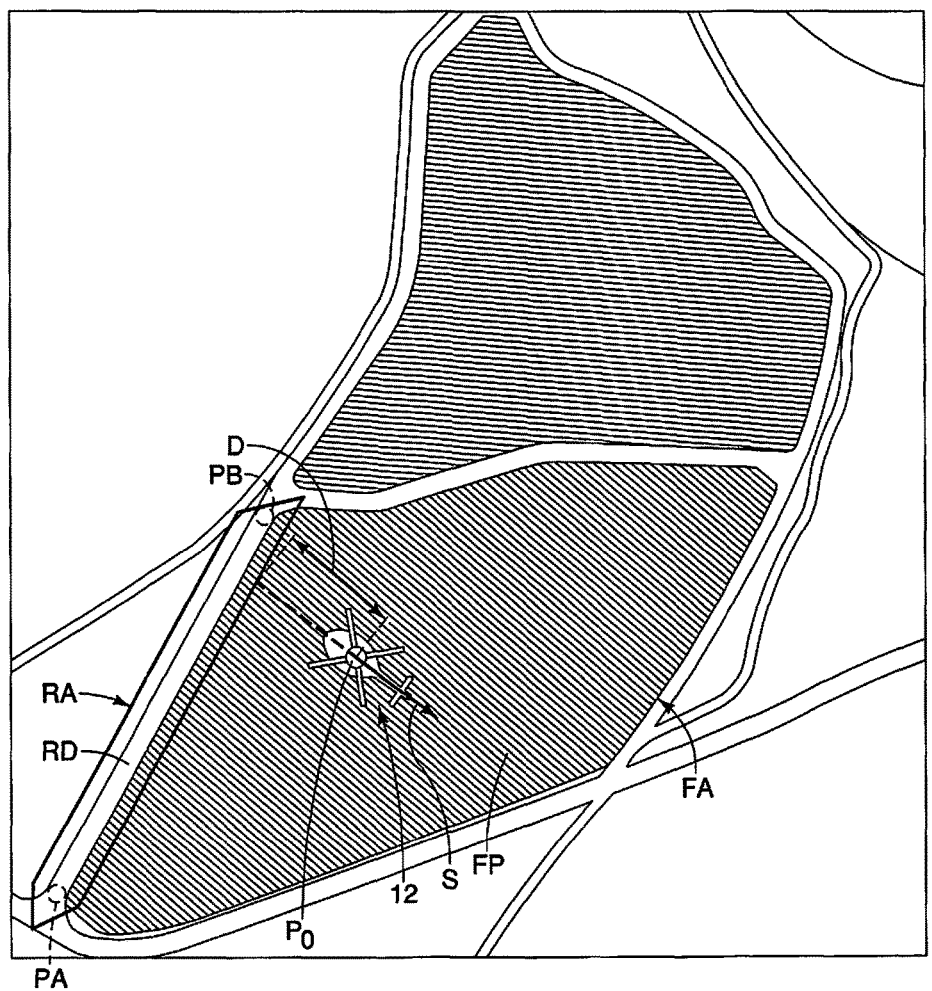
FIG. 6 is a top plan view of the flight area of the aircraft, schematically illustrating the aircraft flying within the predetermined flight area for explaining an algorithm for turning on green signal lights of the traffic signals.

Referring now to FIGS. 4-6, a traffic signal control method of the traffic control system 10 will be discussed in detail. With this traffic signal control method, the traffic signals 16A and 16B are automatically controlled by the traffic signal control stations 14A and 14B based on the operational status of the aircraft 12. Specifically, as illustrated in FIGS. 4-6, the traffic signal control method of the traffic control system 10 is performed while the aircraft 12 is manually or autonomously controlled to follow a target flight path FP within the predetermined flight area FA.

As illustrated in FIG. 4, a restricted area RA is preset relative to a perimeter road or area RD of the predetermined flight area FA through the GUI of the control module 18. In the illustrated embodiment, the restricted area RA is preset in advance such that the restricted area RA surrounds a restricted section of the perimeter road or area RD of the predetermined flight area FA that is to be closed or opened based on the operational status of the aircraft 12. In the illustrated embodiment, the traffic signals 16A and 16B are placed in advance at end locations PA and PB (e.g., entrance/exit) of the restricted section of the perimeter road or area RD of the predetermined flight area FA, respectively.

As illustrated in FIG. 4, the restricted area RA is set as a polygonal area that is defined on a map data including the predetermined flight area FA. Specifically, the geographical location of the restricted area RA is set by specifying the north position (latitude) and the east position (longitude) of each of vertices/corners of the polygonal area through the GUI of the control module 18. In the illustrated embodiment, the vertices/corners of the polygonal area are specified by touching corresponding locations of the map data that is displayed on the screen of the control module 18. In the illustrated embodiment, the restricted area RA is set as a pentagonal area. However, it will be apparent to those skilled in the field of traffic control systems from this disclosure that the restricted area RA can have other shape, such as a triangle, a rectangle and the like. Furthermore, in the illustrated embodiment, the restricted area RA is bounded by a chain of straight line segments. However, it will be apparent to those skilled in the field of traffic control systems from this disclosure that the restricted area RA can be bounded by a chain of curved line segments. When the restricted area RA is set through the GUI of the control module 18, the control module 18 sends the restricted area information indicative of the restricted area RA to the traffic signal control stations 14A and 14B. In the illustrated embodiment, the restricted area information includes coordinates (the latitude and the longitude) of the vertices/corners of the restricted area RA, for example.

Referring now to FIGS. 5 and 6, algorithms for controlling the traffic signals 16A and 16B will be discussed in detail. The traffic signal control stations 14A and 14B executes these algorithms based on the operational status of the aircraft 12 obtained from the aircraft 12 and the restricted area information obtained from the control module 18.

Referring initially to FIG. 5, an algorithm for turning on the red signal lights of the traffic signals 16A and 16B will be explained. The traffic signal control stations 14A and 14B turn on the red signal lights of the traffic signals 16A and 16B while determining one of the following conditions A1 and A2 is met:

Condition A1: a line segment L between a current position $P_0$ of the aircraft 12 and a future position $P_{T1}$ of the aircraft 12 intersects with the restricted area RA; and Condition A2: a distance D between the current position $P_0$ of the aircraft 12 and the restricted area RA is smaller than a predetermined threshold D1.

Specifically, in order to determine the conditions A1 and A2, the main controllers 30 of the traffic signal control stations 14A and 14B first receive the operational status of the aircraft 12 from the aircraft 12, such as the current position $P_0$ of the aircraft 12 (i.e., current north position Pn(0) and current east position Pe(0)), a heading of the aircraft 12 and a velocity of the aircraft 12 (i.e., velocity north Vn and velocity east Ve). Then, the main controllers 30 estimate the future position $P_{T1}$ of the aircraft 12 after T1 seconds (time parameter T1) based on the operational status of the aircraft 12 in the following manner.

Specifically, the main controllers 30 first determine whether the aircraft 12 is hovering. In particular, the main controllers 30 determine whether the following condition (I) is satisfied:

$$|Ve|<A \text{ AND } |Vn|<A \qquad (I)$$

where Ve (m/s) represents the velocity east of the aircraft 12, Vn (m/s) represents the velocity north of the aircraft, and A (m/s) represents a threshold. In the illustrated embodiment, the threshold A is set to 0.05 (m/s), for example: Of course, instead of using the above-mentioned condition (I), hovering of the aircraft 12 can be determined using the magnitude of the velocity vector (i.e., $\sqrt{(Ve^2+Vn^2)}$) of the aircraft 12. Specifically, in this case, hovering of the aircraft 12 can be determined when the main controllers 30 determine that the magnitude of the velocity vector is less than a predetermined threshold.

If the condition (I) is satisfied, then the main controllers 30 determine that the aircraft 12 is hovering. Then, the main controllers 30 determine that the velocity east Ve and the velocity north Vn are zero (Ve=0 and Vn=0), and the future position $P_{T1}$ after T1 seconds (Pn(T1), Pe(T1)) is calculated by the following equations (1):

$$Pn(T1)=Pn(0); \text{ and}$$

$$Pe(T1)=Pe(0). \qquad (1)$$

On the other hand, if the condition (I) is not satisfied, then the main controllers 30 determine that the aircraft 12 is not hovering, and is traveling. Then, the main controllers 30 further determine whether the aircraft 12 is turning. Specifically, the main controllers 30 determine whether the following condition (II) is satisfied:

$$|\Omega| \geq B \qquad (II)$$

where $\Omega$ (rad/s) represents the yaw rate of the aircraft 12, and B (rad/s) represents a threshold. In the illustrated embodiment, the threshold B is set to $\pi/360$ (rad/s) (=0.5 (deg/s)), for example.

If the condition (II) is satisfied, then the main controllers 30 determine that the aircraft 12 is turning. Then, the main controllers 30 calculate the future position $P_{T1}$ after T1 seconds (Pn(T1), Pe(T1)) by the following equations (2):

$$Pn(T1)=Pn(0)+\Delta n; \text{ and}$$

$$Pe(T1)=Pe(0)+\Delta e \qquad (2)$$

where $\Delta n$ represents an amount of travel to north during T1 seconds, and $\Delta e$ represents an amount of travel to east during T1 seconds. The main controllers 30 calculate the amounts of travel ($\Delta n$, $\Delta e$) as follows:

$$\Delta n=\Delta x \cdot \sin \psi + \Delta y \cdot \cos \psi; \text{ and}$$

$$\Delta e=\Delta x \cdot \cos \psi - \Delta y \cdot \sin \psi$$

where $\Delta x$ represents an amount of travel along the X-axis during T1 seconds, $\Delta y$ represents an amount of travel along the Y-axis during T1 seconds, and $\psi$ (rad) represents the direction in which the aircraft 12 is traveling (i.e., the track over the ground). The main controllers 30 calculate the amounts of travel ($\Delta x$, $\Delta y$), and the direction $\psi$ as follows:

$$\Delta x = R \sin \theta;$$

$$\Delta y = R(1-\cos \theta) \times \text{sign(turn)}; \text{ and}$$

$$\psi = \tan^{-1}(Vn/Ve).$$

where R (m) represents a turn radius of the aircraft 12, $\theta$ (rad) represents an amount of turn during T1 seconds, and sign(turn) represents the direction of turn. The main controllers 30 calculate the turn radius R and the amount of turn $\theta$ as follows:

$$R=V/|\Omega|, \text{ where } V=\sqrt{(Ve^2+Vn^2)}; \text{ and}$$

$$\theta=\Omega \cdot T1.$$

Also, the sign function sign(turn) represents the direction of turn of the aircraft 12, and the parameter "turn" is calculated as follows:

$$\text{turn}=\text{sign}(\Omega).$$

On the other hand, if the condition (II) is not satisfied, then the main controllers 30 determine that the aircraft 12 is not turning, and is traveling straight. Then, the main controllers 30 calculate the future position $P_{T1}$ after T1 seconds (Pn(T1), Pe(T1)) by the following equations (3):

$$Pn(T1)=Pn+\Delta n; \text{ and}$$

$$Pe(T1)=Pe+\Delta e \qquad (3)$$

where the amounts of travel ($\Delta n$, $\Delta e$) are calculated as follows:

$$\Delta n = Vn \cdot T1; \text{ and}$$

$$\Delta e = Ve \cdot T1.$$

In the illustrated embodiment, the main controllers 30 determine whether the aircraft 12 is hovering and whether the aircraft 12 is turning. However, the main controllers 30 can merely estimate the future position $P_{T1}$ after T1 seconds solely based on the equations (3) without determining whether the aircraft 12 is hovering and whether the aircraft 12 is turning. In the illustrated embodiment, the time parameter T1 is set to 30 seconds, for example. However, it will be apparent to those skilled in the field of traffic control systems from this disclosure that time parameter T1 can be set to different values as needed and/or required.

Furthermore, the main controllers 30 determine whether the line segment L between the current position $P_0$ and the future position $P_{T1}$ intersects with the restricted area RA. Specifically, the main controllers 30 retrieve the restricted area information stored in the memories 36, respectively, and determine whether the line segment L intersects with one of the line segments (edges) of the restricted area RA. For example, the main controllers 30 determine, for each of the line segments (edges) of the restricted area RA, if an intersection of a line extending along the line segment L and a line extending along a line segment (edge) of the restricted area RA is located between the current position $P_0$ and the future position $P_{T1}$ and is located between ends of the line segment (edge) of the restricted area RA. Of course, various algorithms for checking if two given line segments intersect with each other (i.e., line segment intersection problem) are known in the field of computational geometry, and thus will not be described in detail.

If the main controllers 30 determine that the line segment L intersects with the restricted area RA (i.e., the condition A1 is met), then the main controllers 30 send the control signals to turn on the red signal lights of the traffic signals 16A and 16B to the traffic signals 16A and 16B. The condition A1 can be met while the aircraft 12 is traveling towards the restricted area RA, for example. Thus, in the illustrated embodiment, the main controllers 30 control the traffic signals 16A and 16B to signal the closure of the restricted area RA (e.g., at least one of an area and a road)

by turning on the red signal lights while the aircraft 12 is travelling towards the restricted area RA. Specifically, in the illustrated embodiment, the main controllers 30 control the traffic signals 16A and 16B based on both the current position the current position $P_0$ of the aircraft 12 (e.g., the position data of the aircraft) and the direction of travel of the aircraft 12 (e.g., the direction data of the aircraft). Also, the main controllers 30 control the traffic signals 16A and 16B based on the velocity of the aircraft 12 (e.g., the velocity data of the aircraft).

On the other hand, the main controllers 30 also calculate the distance D between the current position $P_0$ of the aircraft 12 and the restricted area RA, and determine whether the distance D is smaller than the predetermined threshold D1 (i.e., Condition A2). As illustrated in FIG. 5, the distance D is calculated as a distance between the current position $P_0$ of the aircraft 12 and the closest one of the line segments (edges) of the restricted area RA along a traveling direction of the aircraft 12 (i.e., along a direction of the velocity vector of the aircraft 12 or a direction data). Of course, the distance D can be calculated in a different manner. For example, the distance D can be calculated as a distance between the current position $P_0$ of the aircraft 12 and the closest one of the line segments (edges) of the restricted area RA in a direction perpendicular to the closest one of the line segments (i.e., the shortest distance from the current position $P_0$ to the closest one of the line segments). The main controllers 30 further determine whether the calculated distance D is smaller than the predetermined threshold D1. In the illustrated embodiment, the predetermined threshold D1 is set to 5 meters, for example. Of course, the predetermined threshold D1 can be set to other value as needed and/or desired.

If the main controllers 30 determine that the distance D is smaller than the predetermined threshold D1 (i.e., the condition A2 is met), then the main controllers 30 send the control signals to turn on the red signal lights of the traffic signals 16A and 16B to the traffic signals 16A and 16B. The condition A2 can be met while the aircraft 12 is hovering or slowly traveling near the restricted area RA, for example. Thus, in the illustrated embodiment, the main controllers 30 control the traffic signals 16A and 16B to signal the closure of the restricted area RA by turning on the red signal lights while the aircraft 12 is located within the predetermined threshold D1 (e.g., the first predetermined distance) from the restricted area RA. Specifically, in the illustrated embodiment, the main controllers 30 control the traffic signals 16A and 16B based on at least the the current position $P_0$ of the aircraft 12 (e.g., the position data of the aircraft).

Referring now to FIG. 6, an algorithm for turning on the green signal lights of the traffic signals 16A and 16B will be explained. The traffic signal control stations 14A and 14B turn on the green signal lights of the traffic signals 16A and 16B while determining one of the following conditions B1 and B2 is met:

Condition B1: a change rate S of the distance D with respect to time (hereinafter "time derivative S") is larger than a predetermined threshold S1 while the distance D is larger than a predetermined threshold D2; and Condition B2: the distance D is larger than a predetermined threshold D3.

Specifically, in order to determine the conditions B1 and B2, the main controllers 30 of the traffic signal control stations 14A and 14B first receive the operational status of the aircraft 12 from the aircraft 12. Then, the main controllers 30 calculate the distance D between the current position $P_0$ of the aircraft 12 and the restricted area RA in the above-mentioned manner. Also, the main controllers 30 calculate the time derivative S (m/s) of the distance D. The time derivative S indicates a rate or speed of the aircraft 12 moving away from the restricted area RA. In the illustrated embodiment, the predetermined threshold S1 is set to 3 meters per second (m/s), for example. Also, in the illustrated embodiment, the predetermined threshold D2 is set to 10 meters, while the predetermined threshold D3 is set to 15 meters, for example. Of course, the predetermined thresholds S1, D2 and D3 can be set to other values as needed and/or desired. However, in the illustrated embodiment, the predetermined thresholds D1, D2 and D3 are set as follows to realize effective hysteresis:

$$D3 > D2 > D1.$$

Thus, if the main controllers 30 determine that the distance D is larger than the predetermined threshold D2 and that the time derivative S is larger than the predetermined threshold S1 (i.e., the condition B1 is met), then the main controllers 30 send the control signals to turn on the green signal lights of the traffic signals 16A and 16B to the traffic signals 16A and 16B. The condition B1 can be met while the aircraft 12 is traveling near the restricted area RA along the restricted area RA or away from the restricted area RA, for example. Thus, in the illustrated embodiment, the main controllers 30 control the traffic signals 16A and 16B to signal or maintain the non-closure state of the restricted area RA (e.g., at least one of an area and a road) by turning on the green signal lights while the aircraft 12 is travelling away from the restricted area RA. Specifically, in the illustrated embodiment, the main controllers 30 control the traffic signals 16A and 16B based on at least the the current position $P_0$ of the aircraft 12 (e.g., the position data of the aircraft). Also, the main controllers 30 control the traffic signals 16A and 16B based on the velocity of the aircraft 12 (e.g., the velocity data of the aircraft).

On the other hand, if the main controllers 30 determine that the distance D is larger than the predetermined threshold D3 (i.e., the condition B2 is met), then the main controllers 30 send the control signals to turn on the green signal lights of the traffic signals 16A and 16B to the traffic signals 16A and 16B. The condition B2 can be met while the aircraft 12 is hovering or slowly traveling near the restricted area RA, for example. Thus, in the illustrated embodiment, the main controllers 30 control the traffic signals 16A and 16B to maintain the non-closure state of the restricted area RA (e.g., at least one of the area and the road) by turning on the green signal lights while the aircraft 12 is located outside the predetermined threshold D3 (e.g., the second predetermined distance) from the restricted area RA. Specifically, in the illustrated embodiment, the main controllers 30 control the traffic signals 16A and 16B based on at least the the current position $P_0$ of the aircraft 12 (e.g., the position data of the aircraft).

Figure 7:
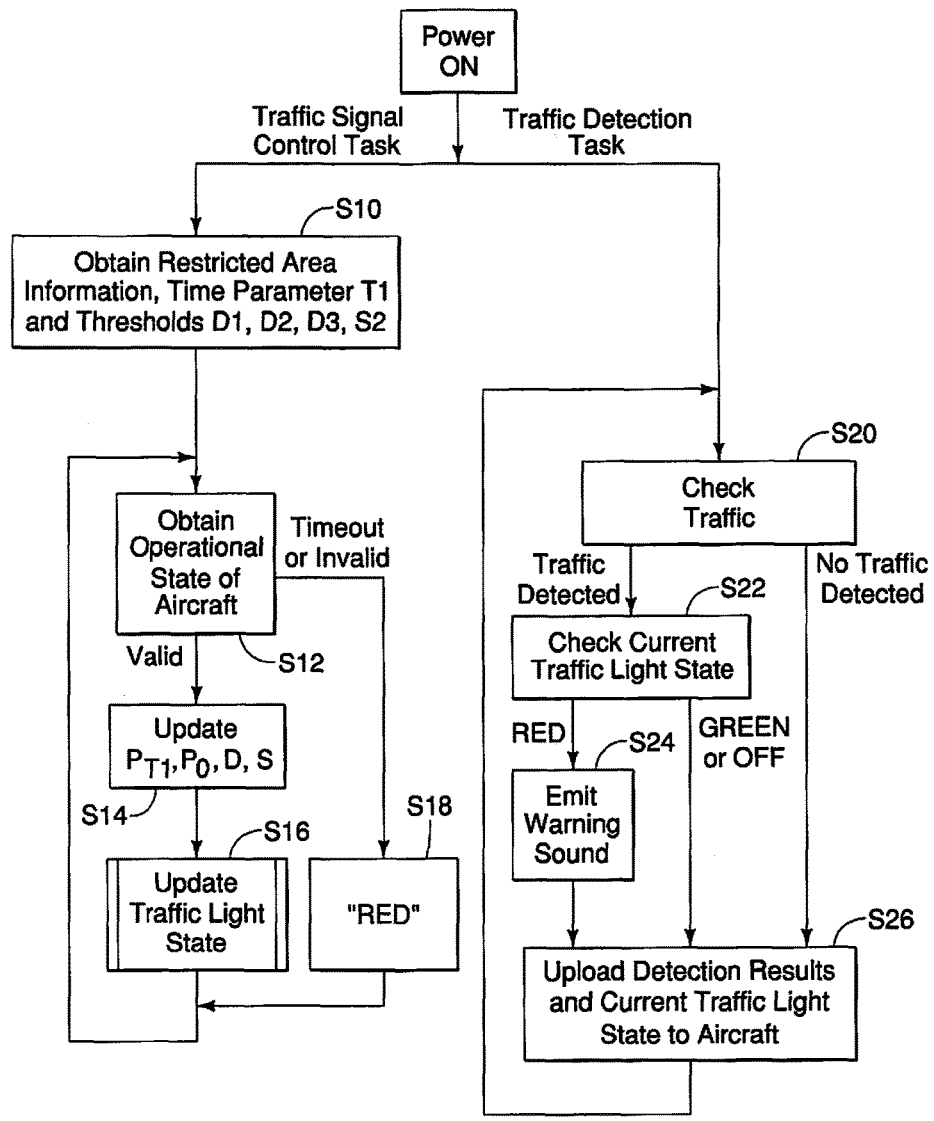
FIG. 7 is a flow chart of an overall process of a traffic signal control method executed by the traffic signal control stations.
Figure 8:
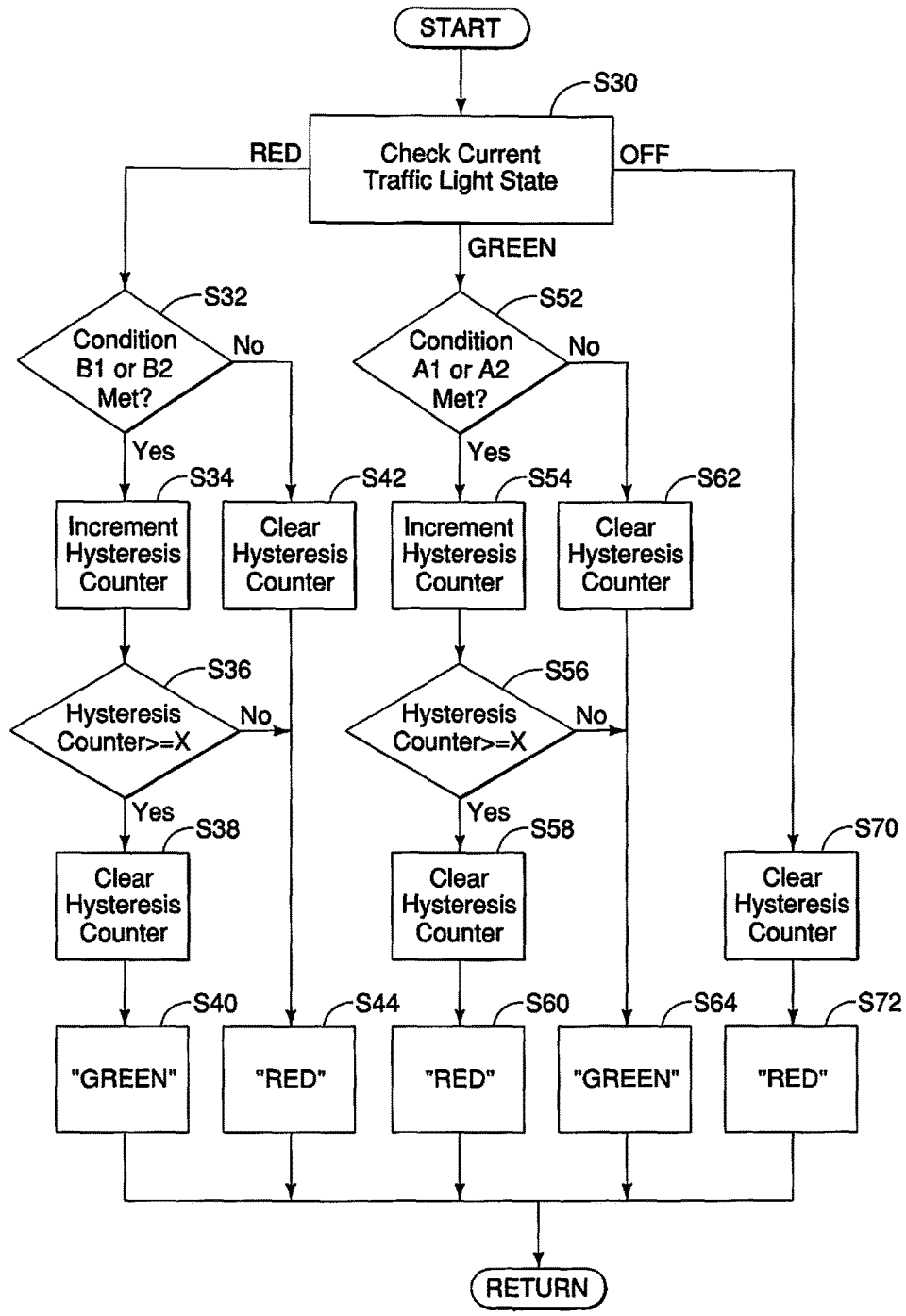
FIG. 8 is a flow chart of a process of updating traffic light state of the traffic signals in the traffic signal control method illustrated in FIG. 7.

Referring now to FIGS. 7 and 8, the traffic signal control method of the traffic control system 10 will be discussed through flowcharts. First, all of the devices of the traffic control system 10 is turned on. When the traffic signal control stations 14A and 14B are turned on, then each of the traffic signal control stations 14A and 14B spawns or starts a traffic signal control task (steps S10 to S18) and a traffic detection task (steps S20 to S26). In the illustrated embodiment, the traffic signal control task and the traffic detection task start in response to turning on the traffic signal control stations 14A and 14B, and repeatedly continue until the traffic signal control stations 14A and 14B are turned off.

Referring initially to FIGS. 7 and 8, the traffic signal control task will be discussed in detail. With the traffic signal control task, the main controllers 30 of the traffic signal control stations 14A and 14B obtain the restricted area information indicative of the restricted area RA, the time parameter T1 and the predetermined thresholds D1, D2, D3 and S1 (step S10). The restricted area information are preset and stored in the memories 36 of the traffic signal control stations 14A and 14B. Of course, the restricted area information can be newly obtained from the control module 18 in response to setting of the restricted area RA through the GUI of the control module 18. In the initial state of the traffic signals 16A and 16B, the traffic lights of the traffic signals 16A and 16B are turned off (i.e., the current traffic light state is in "OFF" state).

After the process of step S10, the main controllers 30 of the traffic signal control stations 14A and 14B further obtain the operational state of the aircraft 12 (step S12). If valid operational state of the aircraft 12 is obtained ("Valid" in step S12), then the main controllers 30 of the traffic signal control stations 14A and 14B update or calculate the current position $P_0$ of the aircraft 12, the future position $P_{T1}$ of the aircraft 12, the distance D between the current position $P_0$ of the aircraft 12 and the restricted area RA and the time derivative S of the distance D (step S14). Here, if the obtained operational state of the aircraft 12 has a value within a predetermined range, then the main controllers 30 determines that the obtained operational state of the aircraft 12 is valid, for example.

After the process of step S14, the main controllers 30 of the traffic signal control stations 14A and 14B start updating the traffic light state of the traffic signals 16A and 16B (step S16). The process of updating the traffic light state of the traffic signals 16A and 16B will be discussed later by referring to FIG. 8.

On the other hand, in step S12, if the main controllers 30 of traffic signal control stations 14A and 14B do not obtain the operational state of the aircraft 12 within a predetermined time period (10 seconds, for example) ("Timeout" in step S12) or if the obtained operational state of the aircraft 12 is invalid ("Invalid" in step S12), then the main controllers 30 send the control signals to turn on the red signal lights of the traffic signals 16A and 16B to the traffic signals 16A and 16B (i.e., the current traffic light state is in "RED" state) (step S18).

Referring now FIG. 8, the process of updating the traffic light state of the traffic signals 16A and 16B in step S16 will be discussed in detail. As illustrated in FIG. 7, after the process of step S14, the main controllers 30 of the traffic signal control stations 14A and 14B start this process. First, the main controllers 30 of the traffic signal control stations 14A and 14B check the current traffic light state received from the traffic signals 16A and 16B (step S30).

If the current traffic light state is in "RED" state ("RED" in step S30), then the main controllers 30 determine whether one of the above-mentioned conditions B1 and B2 for truing on the green signal lights of the traffic signals 16A and 16B is met (step S32). If one of the conditions B1 and B2 is met ("Yes" in step S32), then the main controllers 30 increment the value of hysteresis counter (step S34) and determine whether the value of the hysteresis counter is equal or more than a predetermined value X (step S36). In the illustrated embodiment, the predetermined value X is set to 5, for example, to prevent frequent switching of the traffic lights of the traffic signals 16A and 16B. Of course, the predetermined value X can be set to a different value.

If the value of the hysteresis counter is equal or more than the predetermined value X ("Yes" in step S36), then the main controllers 30 clear the value of the hysteresis counter (step S38) and update the traffic light state of the traffic signals 16A and 16B to turn on the green signal lights of the traffic signals 16A and 16B (i.e., the current traffic light state is updated to "GREEN" state) (step S40). In particular, the main controllers 30 send the control signals to turn on the green signal lights of the traffic signals 16A and 16B to the traffic signals 16A and 16B. Then, the process returns to step S12 in FIG. 7.

On the other hand, if none of the conditions B1 and B2 are met ("No" in step S32), then the main controllers 30 clear the value of the hysteresis counter (step S42) and maintain the traffic light state of the traffic signals 16A and 16B to turn on the red signal lights of the traffic signals 16A and 16B (i.e., the current traffic light state is maintained to "RED" state) (step S44). In particular, the main controllers 30 send the control signals to turn on the red signal lights of the traffic signals 16A and 16B to the traffic signals 16A and 16B. Then, the process returns to step S12 in FIG. 7.

Similarly, if the value of the hysteresis counter is not equal or more than the predetermined value X ("No" in step S36), then the main controllers 30 maintain the traffic light state of the traffic signals 16A and 16B to turn on the red signal lights of the traffic signals 16A and 16B (i.e., the current traffic light state is maintained to "RED" state) (step S44). Then, the process returns to step S12 in FIG. 7.

Furthermore, if the current traffic light state is in "GREEN" state ("GREEN" in step S30), then the main controllers 30 determine whether one of the above-mentioned conditions A1 and A2 for turning on the red signal lights of the traffic signals 16A and 16B is met (step S52). If one of the conditions A1 and A2 is met ("Yes" in step S52), then the main controllers 30 increment the value of hysteresis counter (step S54) and determine whether the value of the hysteresis counter is equal or more than a predetermined value X (step S56). In the illustrated embodiment, the predetermined value X is set to 5, for example, to prevent frequent switching of the traffic lights of the traffic signals 16A and 16B. Of course, the predetermined value X can be set to a different value.

If the value of the hysteresis counter is equal or more than the predetermined value X ("Yes" in step S56), then the main controllers 30 clear the value of the hysteresis counter (step S58) and update the traffic light state of the traffic signals 16A and 16B to turn on the red signal lights of the traffic signals 16A and 16B (i.e., the current traffic light state is updated to "RED" state) (step S60). In particular, the main controllers 30 send the control signals to turn on the red signal lights of the traffic signals 16A and 16B to the traffic signals 16A and 16B. Then, the process returns to step S12 in FIG. 7.

On the other hand, if none of the conditions A1 and A2 are met ("No" in step S52), then the main controllers 30 clear the value of the hysteresis counter (step S62) and maintain the traffic light state of the traffic signals 16A and 16B to turn on the green signal lights of the traffic signals 16A and 16B (i.e., the current traffic light state is maintained to "GREEN" state) (step S64). In particular, the main controllers 30 send the control signals to turn on the green signal lights of the traffic signals 16A and 16B to the traffic signals 16A and 16B. Then, the process returns to step S12 in FIG. 7.

Furthermore, if the value of the hysteresis counter is not equal or more than the predetermined value X ("No" in step S56), then the main controllers 30 maintain the traffic light state of the traffic signals 16A and 16B to turn on the green signal lights of the traffic signals 16A and 16B (i.e., the current traffic light state is maintained to "GREEN" state) (step S64). Then, the process returns to step S12 in FIG. 7.

Furthermore, if the current traffic light state is in "OFF" state ("OFF" in step S30), then the main controllers 30 clear the value of the hysteresis counter (step S70) and update the traffic light state of the traffic signals 16A and 16B to turn on the red signal lights of the traffic signals 16A and 16B (i.e., the current traffic light state is updated to "RED" state) (step S72). Then, the process returns to step S12 in FIG. 7.

Referring back to FIG. 7, the traffic detection task will be discussed in detail. With the traffic detection task, the main controllers 30 of the traffic signal control stations 14A and 14B obtain the detection results of the traffic detectors 20A and 20B, and check the presence of the traffic approaching or intruding the restriction area RA (step S20). If the presence of the traffic is determined, then the main controllers 30 of the traffic signal control stations 14A and 14B further check the current traffic light state received from the traffic signals 16A and 16B (step S22).

If the current traffic light state is in "RED" state ("RED" in step S22), then the main controllers 30 send the control signals to the traffic signals 16A and 16B to emit warning sounds from speakers of the traffic signals 16A and 16B. The warning sounds can be any types of sounds, such as voice warnings, beeps and the like, as long as the traffic can hear the waring sounds. Of course, when only one of the traffic detectors 20A and 20B detects the presence of the traffic, only one of the main controllers 30 connected to the one of the traffic detectors 20A and 20B can send the control signals to corresponding one of the traffic signals 16A and 16B to emit the warning sounds from a speaker of the corresponding one of the traffic signals 16A and 16B.

Then, the main controllers 30 of the traffic signal control stations 14A and 14B send the detection results of the traffic detectors 20A and 20B and the current traffic light state to the aircraft 12 (step S26). In response, the onboard controller 40 of the aircraft 12 can control the aircraft 12 to stop travelling towards the restricted area RA and/or send warning messages to the remote controller 22 to notify the operator of the remote controller 22 of the presence of the traffic near the restricted area RA. Then, the process returns to step S20.

On the other hand, if the presence of the traffic is not determined (step S20) or if the current traffic light state is in "GREEN" state or in "OFF" state ("GREEN or OFF" in step S22), then the process proceeds to step S26. The main controllers 30 of the traffic signal control stations 14A and 14B send the detection results of the traffic detectors 20A and 20B and the current traffic light state to the aircraft 12 (step S26). Then, the process returns to step S20.

In the illustrated embodiment, the main controllers 30 of the traffic signal Control stations 14A and 14B execute all of the processes illustrated in FIGS. 7 and 8. However, some of the processes can be executed by the devices of the traffic control system 10 other than the traffic signal control stations 14A and 14B. For example, in the illustrated embodiment, the main controllers 30 estimate the future position $P_{T1}$ of the aircraft 12. However, the onboard controller 40 of the aircraft 12 can estimate the future position $P_{T1}$ of the aircraft 12, and transmit or broadcast the future position $P_{T1}$ of the aircraft 12 as the operational status of the aircraft 12 via the datalink module 42.

In the illustrated embodiment, the main controllers 30 of the traffic signal control stations 14A and 14B independently execute all of the process illustrated in FIGS. 7 and 8. However, it will be apparent to those skilled in the field of traffic control systems from this disclosure that only one of the traffic signal control stations 14A and 14B (i.e., a master control station) executes all of the process illustrated in FIGS. 7 and 8, and transmits processing results to the other one of the traffic signal control stations 14A and 14B (i.e., a slave control station) through a wireless or wired connection therebetween such that the other one of the traffic signal control stations 14A and 14B controls corresponding one of the traffic signals 16A and 16B according to the processing results of the one of the traffic signal control stations 14A and 14B.

Furthermore, the traffic control system 10 can further include a computing device other than the traffic signal control stations 14A and 14B as a master control station. The computing device can be configured to execute at least some of the process illustrated in FIGS. 7 and 8. In response, the traffic signal control stations 14A and 14B can further be configured to control the traffic signals 16A and 16B according to the processing results of the computing device. More specifically, the computing device can be provided as a cloud computing platform or virtual computer interconnected to the various components of the traffic control system 10 through a computer network, such as the Internet. In particular, at least one of the aircraft 12, the traffic signal control stations 14A and 14B, the traffic signals 16A and 16B, the control module 18, the traffic detectors 20A and 20B, the remote controller 22 and the aircraft control station 24 can be configured to send various data to this cloud computing platform. For example, at least one of the aircraft 12, the remote controller 22 and the aircraft control station 24 can be configured to send the operational state of the aircraft 12 to the cloud computing platform. The traffic signals 16A and 16B can be configured to send the current traffic light state to the cloud computing platform. The control module 18 can be configured to send the restricted area information to the cloud computing platform. Also, the traffic detectors 20A and 20B can be configured to send the captured videos and/or the detection results to the cloud computing platform. In response, the cloud computing platform executes the process illustrated in FIGS. 7 and 8. For example, the cloud computing platform executes estimating of the future position $P_{T1}$ of the aircraft 12 (step S14), updating the traffic light state (step S16), and the like. In response, the traffic signal control stations 14A and 14B obtain the processing results, such as the update of the traffic light state, from the cloud computing platform, and control the traffic signals 16A and 16B to update the traffic light state according to the processing results of the cloud computing platform.

In the illustrated embodiment, as illustrated in FIG. 4, a single one of the restricted area RA is set relative to the perimeter road or area RD of the predetermined flight area FA. However, it will be apparent to those skilled in the field of traffic control systems from this disclosure that a plurality of restricted areas RA can be set relative to the perimeter road or area RD of the predetermined flight area FA, as needed and/or desired. In this case, the number of the traffic signal control stations 14A and 14B, the traffic signals 16A and 16B and the traffic detectors 20A and 20B can be increased according to the number of the restricted areas RA. Furthermore, in the illustrated embodiment, the restricted area RA is set along the perimeter road or area RD. However, the restricted area RA can be set at any locations of the predetermined flight area FA.

In the illustrated embodiment, the main controllers 30 of the traffic signal control stations 14A and 14B check both of the conditions B1 and B2, and determine whether one of the conditions B1 and B2 is met (step S32 in FIG. 8). However, the main controllers 30 can check only one of the conditions B1 and B2 instead of checking both of the conditions B1 and B2 in step S32. Also, in the illustrated embodiment, the main controllers 30 check both of the conditions A1 and A2, and determine whether one of the conditions A1 and A2 is met (step S52 in FIG. 8). However, the main controllers 30 can check only one of the conditions A1 and A2 instead of checking both of the conditions A1 and A2 in step S52.

Furthermore, the main controllers 30 of the traffic signal control stations 14A and 14B can check a condition other than the conditions B1 and B2 in step S32 and a condition other than the conditions A1 and A2 in step S52. For example, the main controllers 30 can check if the aircraft 12 is located within a third predetermined distance from the restricted area RA and is traveling towards the restricted area RA, instead of checking the conditions B1 and B2 in step S32. Also, the main controllers 30 can check if the aircraft 12 is located within a fourth predetermined distance from the restricted area RA and is traveling away from the restricted area RA, instead of checking the conditions A1 and A2 in step S52. In this case, the main controllers 30 can control the traffic signals 16A and 16B to signal the closure of the restricted area RA by turning on the red signal lights while the aircraft 12 is located within the third predetermined distance from the restricted area RA and is traveling towards the restricted area RA. Also, the main controllers 30 control the traffic signals 16A and 16B to maintain the non-closure state of the restricted area RA by turning on the green signal lights while the aircraft 12 is located within the fourth predetermined distance from the restricted area RA and is traveling away from the restricted area RA. In this case, the third predetermined distance can be equal to or larger than the fourth predetermined distance, for example.

In the illustrated embodiment, as illustrated in FIG. 1, the traffic signals 16A and 16B each include a traffic light with the red, yellow and green signal lights. However, it will be apparent to those skilled in the field of traffic control systems from this disclosure that the traffic control system 10 can be configured with other types of traffic signals.

Figure 9:
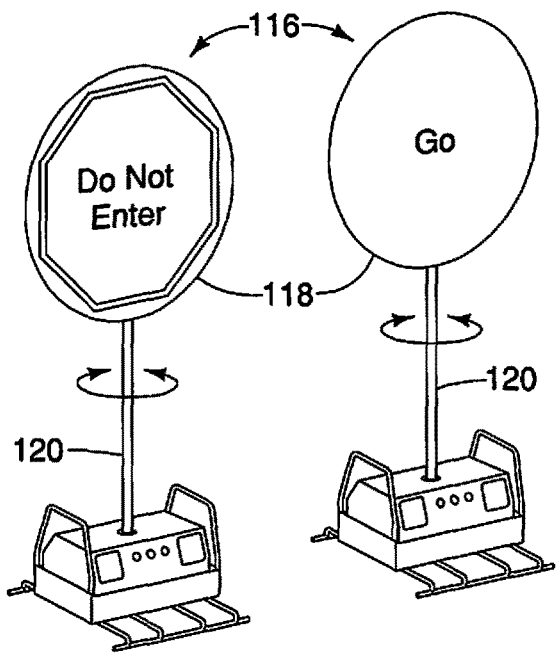
FIG. 9 is a perspective view of a traffic signal in accordance with a modification example, illustrating a traffic sign of the same traffic signal rotating to show opposite faces of the traffic sign.

Specifically, as illustrated in FIG. 9, the traffic control system 10 can be configured with a traffic signal 116 that includes a movable traffic sign 118. In the illustrated embodiment, the traffic sign 118 is movable. In particular, the traffic sign 118 is rotatably supported by a support shaft 120. In the illustrated embodiment, the traffic sign 118 is a circular panel having characters "Do Not Enter" to sign a closure of the restricted area RA on one face of the traffic sign 118, and characters "Go" to sign a non-closure state of the restricted area RA on the other face of the traffic sign 118. Of course, the traffic sign 118 can have symbols to sign the closure of the restricted area RA on the one face of the traffic sign 118, and symbols to sign the non-closure state of the restricted area RA on the other face of the traffic sign 118. The traffic signal 116 is controlled by corresponding one of the traffic signal control stations 14A and 14B, and rotates to show one of the faces of the traffic sign 118 according to the control signals from the corresponding one of the traffic signal control stations 14A and 14B.

Figure 10:
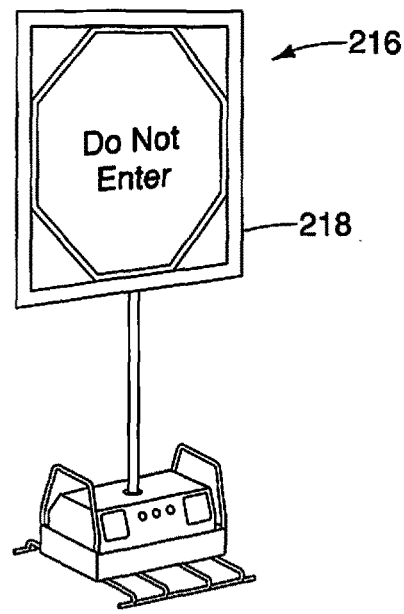
FIG. 10 is a perspective view of a traffic signal in accordance with another modification example, illustrating a display of the traffic signal displaying a traffic sign.

Furthermore, as illustrated in FIG. 10, the traffic control system 10 can be configured with a traffic signal 216 that includes a display 218. In the illustrated embodiment, the display 218 has a liquid-crystal display, for example. However, it will be apparent to those skilled in the field of traffic control systems from this disclosure that the display 218 has other types of displays. The display 218 is controlled by corresponding one of the traffic signal control stations 14A and 14B to switchably display characters or symbols to sign a closure of the restricted area RA (e.g., characters "Do Not Enter" is displayed on the display 218 in FIG. 10) and characters or symbols to sign a non-closure state of the restricted area RA according to the control signals from the corresponding one of the traffic signal control stations 14A and 14B.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Unless otherwise defined, all terms (including technical and scientific terms) used herein have the same meaning as commonly understood by one of ordinary skill in the field of traffic control systems to which illustrative embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Additionally, similar words used to describe the relationship between elements or layers should be interpreted in a like fashion (e.g., "between" versus "directly between", "above" versus "directly above", "below" versus "directly below", "adjacent" versus "directly adjacent," "on" versus "directly on"). Thus, components that are shown directly connected or contacting each other can have intermediate structures disposed between them unless specified otherwise.

Spatially relative terms, such as "forward", "rearward", "above", "below", "beneath", "downward", "vertical", "horizontal", and "transverse" as well as any other similar spatial terms may be used herein for the ease of description to describe one element or feature's relationship to another element(s) or feature(s) of the above embodiments. These terms, as utilized to describe the present invention should be interpreted relative to an aircraft on a horizontal surface.

While only a selected embodiment has been chosen to illustrate the present invention, it will be apparent to those skilled in the field of traffic control systems from this disclosure that various changes and modifications can be made herein without departing from the scope of the invention as defined in the appended claims. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A traffic control system comprising:
 at least one traffic signal;
 an aircraft including a position sensor and a wireless communication device;
 a ground control station including an electronic controller and a wireless communication device, the electronic controller being configured to control the at least one traffic signal based on at least one of position data of the aircraft and direction data of the aircraft; and
 a traffic detector configured to detect presence of traffic near the at least one traffic signal,
 the electronic controller being further configured to transmit at least one of detection result of the traffic detector and status of the at least one traffic signal to the aircraft using the wireless communication device of the ground control station.

2. The traffic control system according to claim 1, wherein the electronic controller is further configured to control the at least one traffic signal based on both the position data and the direction data.

3. The traffic control system according to claim 1, wherein the electronic controller is further configured to control the at least one traffic signal based on velocity data of the aircraft.

4. The traffic control system according to claim 1, wherein the at least one traffic signal includes a traffic light.

5. The traffic control system according to claim 1, wherein the at least one traffic signal includes a traffic sign.

6. The traffic control system according to claim 1, wherein the at least one traffic signal is movable.

7. The traffic control system according to claim 1, wherein the ground control station is integrated with the at least one traffic signal.

8. The traffic control system according to claim 1, further comprising
 an additional ground control station,
 the at least one traffic signal including two traffic signals, with the ground control station and the additional ground control station being configured to control the two traffic signals, respectively.

9. The traffic control system according to claim 1, further comprising
 a remote controller configured to manually control the aircraft.

10. The traffic control system according to claim 1, wherein
 the aircraft includes at least one crop dusting tank.

11. The traffic control system according to claim 1, wherein
 the electronic controller is configured to control the at least one traffic signal to signal a closure of at least one of an area and a road while the aircraft is travelling towards the at least one of the area and the road.

12. The traffic control system according to claim 1, wherein
 the electronic controller is configured to control the at least one traffic signal to maintain a non-closure state of at least one of an area and a road while the aircraft is travelling away from the at least one of the area and the road.

13. The traffic control system according to claim 1, wherein
 the electronic controller is configured to control the at least one traffic signal to signal a closure of at least one of an area and a road while the aircraft is located within a first predetermined distance from the at least one of the area and the road, and
 the electronic controller is configured to control the at least one traffic signal to maintain a non-closure state of the at least one of the area and the road while the aircraft is located outside a second predetermined distance from the at least one of the area and the road.

14. The traffic control system according to claim 1, wherein
 the position sensor includes a GPS sensor.

15. The traffic control system according to claim 1, wherein
 the aircraft includes a helicopter.

16. The traffic control system according to claim 1, wherein
 the aircraft includes an unmanned aircraft.

17. The traffic control system according to claim 1, wherein
 the aircraft includes an onboard controller having an auto pilot control program.

18. The traffic control system according to claim 1, wherein
 the electronic controller is configured to transmit the detection result of the traffic detector and the status of the at least one traffic signal to the aircraft using the wireless communication device of the ground control station.

19. The traffic control system according to claim 18, wherein
 the aircraft is configured to stop travelling towards at least one of an area and a road in response to receiving from the ground station the detection result of the traffic detector indicative of the presence of the traffic and the status of the at least one traffic signal indicative of a closure of the at least one of the area and the road.

20. The traffic control system according to claim 1, wherein
 the electronic controller is configured to control the at least one traffic signal to emit sound from a speaker of the at least one traffic signal while the detection result of the traffic detector is indicative of the presence of the traffic and the status of the at least one traffic signal is indicative of a closure of an area and a road.

* * * * *